United States Patent

Wilson

[15] 3,644,187
[45] Feb. 22, 1972

[54] INSTRUMENT FOR MEASURING CONDUCTANCE OR CAPACITANCE OF AN ELECTRICAL LOAD DURING OPERATION

[72] Inventor: Homer M. Wilson, Houston, Tex.
[73] Assignee: Petrolite Corporation, St. Louis, Mo.
[22] Filed: June 15, 1970
[21] Appl. No.: 46,260

Related U.S. Application Data

[62] Division of Ser. No. 717,346, Mar. 29, 1968, Pat. No. 3,566,259.

[52] U.S. Cl............................................204/186, 204/305
[51] Int. Cl.......................................B23c 5/00, B03c 5/02
[58] Field of Search..................204/186, 302, 306, 305; 324/132 X, 61 X

[56] References Cited

UNITED STATES PATENTS 2,995,706  8/1961  Clarridge........................ 324/132 X
3,161,054  12/1964  Cohn.................................324/61 X Primary Examiner—John H. Mack
Assistant Examiner—Neil A. Kaplan
Attorney—Harris, Kiech, Russell & Kern

[57] ABSTRACT

Instrumentation for measuring electrical characteristics of a load during application of stored electrical energy to the load. The current to the load is accurately monitored over a wide dynamic range. An instrument including a current source for charging a capacitance, a switch for discharging the capacitance through a diode into the load, and an RC circuit for developing an output signal which is the derivative of the voltage across the diode, with this output signal being directly proportional to the conductance of the load at any time during the discharge of the capacitance. A similar instrument for measurement of capacitance of a load. The instruments are suitable for the measurement of conductance and capacitance of an electric emulsion treater during operation of the treater.

11 Claims, 6 Drawing Figures

PATENTED FEB 22 1972    3,644,187

INVENTOR
HOMER M. WILSON
BY HIS ATTORNEYS
HARRIS, KIECH, RUSSELL & KERN

INVENTOR
HOMER M. WILSON
BY HIS ATTORNEYS
HARRIS, KIECH, RUSSELL & KERN

INSTRUMENT FOR MEASURING CONDUCTANCE OR CAPACITANCE OF AN ELECTRICAL LOAD DURING OPERATION

This application is a division of my copending application, Ser. No. 717,346, filled Mar. 29, 1968, now U.S. Pat. No. 3,566,259.

This invention relates to apparatus and methods for measuring electrical characteristics of a load during application of power to the load, i.e., dynamic measurements, particularly of conductance and capacitance during application of power in pulses. The invention is especially adapted for continuous measurement of conductance in an electric emulsion treater while the fluid in the treater is being subjected to a pulse-type treatment.

It is an object of the invention to provide such an instrumentation which is simple, reliable, inexpensive, and which has a wide operating range for a given installation. An additional object is to provide such an instrumentation which is passive in nature.

By way of summary, the invention includes charging the capacitance of a first element from a suitable electric power source, and discharging the charged capacitance through rectifier means into a second element, with one of the elements comprising the load and the other comprising a reference element. The rectifier means is selected to have a substantially logarithmic voltage-current characteristic and the voltage developed across the rectifier means during discharge of the capacitance is differentiated providing a derivative signal output the magnitude of which is a function of the impedance of the load element. More specifically, where the first element is a reference capacitance and the second element is the load, the output signal is directly proportional to the conductance of the load. The system of the invention may be used for dynamic measurement of conductance, of capacitance, and both conductance and capacitance. The output signal may be visually noted on a meter or oscilloscope, may be recorded on a strip chart recorder or other device, may be converted to digital data for subsequent manipulation or storage, or may be handled in any other desired manner.

The measuring instrument of the invention has a number of advantages, including low power requirement for measurement, low operating voltage, the use of inexpensive standard components, and the ability to make measurements while the load is in operation. The voltage applied to a treater affects the capacitance and the resistance of the treater. Therefore, dynamic measurements, i.e., measurements made while the treater is in normal operation, are highly desirable for appraising the relationship between the applied voltage pulse and its effect on the material being treated. By contrast, measurements made with steady state voltages would not disclose information as to the actual treating operation.

Other objects, advantages, features, and results the invention will more fully appear in the course of the following description. The drawing merely shows and the description merely describes preferred embodiments of the present invention which are given by way of illustration or example.

Figure 1:
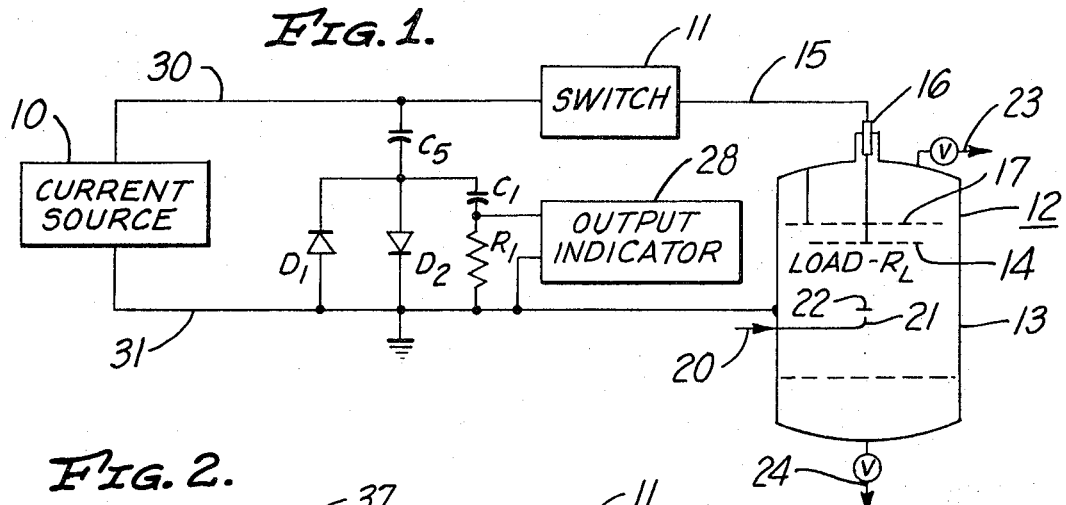
FIG. 1 is an electrical diagram illustrating a preferred embodiment of the measuring instrument of the invention.

The circuit of FIG. 1 includes a current source 10, a capacitance $C_S$, a switch 11, and a load 12. The particular load illustrated is an electric treater which provides for treatment of emulsions or dispersions by high-voltage pulses. Dispersions are resolved by a high-voltage electric field established between electrodes bridged by the dispersion. If the voltage is of sufficient magnitude, it will coalesce or agglomerate the dispersed particles into masses of sufficient size to gravitate from the fluid under treatment.

The load 12 may be a conventional treater with an upright cylindrical container 13 closed at both ends. A set of foraminous electrodes is disposed in a horizontal pattern within the container, including an electrode 14 connected to the switch 11 via a conductor 15 and a feed-through or inlet bushing 16. Another foraminous electrode 17 is disposed above the electrode 14 and is electrically connected to the container 13 which in turn is connected to circuit ground. The fluid to be treated enters inlet line 20 and is discharged into the container 13 through a nozzle 21 directed upward against a baffle 22. The treated fluid leaves the container through a line 23 and water or other material coalesced by the electric field and separated from the fluid being treated leaves through a line 24.

The current source 10 may be conventional in design and preferably is a constant current device or provides an output through a high impedance to produce a linear charging rate for the capacitance $C_S$. The switch 11 may be a conventional mechanical contactor or a conventional controlled rectifier or of other suitable electric switch construction. The switch 11 is periodically closed for a short period of time to discharge the capacitance $C_S$ into the load. The switch may be actuated manually or may be automatically controlled to close at predetermined intervals or may be automatically controlled to close when the voltage on the capacitor reaches a predetermined value.

Rectifiers $D_1$ and $D_2$ are connected in inverse parallel between the capacitance $C_S$ and the current source 10. For unipolar pulses from the source 10, at least one of the rectifiers has a substantially logarithmic voltage-current characteristic. For bipolar pulses, both should have the logarithmic characteristics, and typically, both may comprise silicon diode rectifiers. Any circuit component having the substantially logarithmic voltage-current characteristic of the presently available solid state rectifier may be used in the circuit and the expressions "rectifier means" and "rectifying means" are intended to include such components. The two rectifiers are connected with opposing polarity so that the capacitance $C_S$ is charged from the current source 10 through one of the rectifiers and is discharged through the switch 11 into the load 12 through the other of the rectifiers. The system as illustrated may be operated with unipolar pulses or with bipolar pulses, depending upon the output from the current source 10.

A series circuit comprising a capacitance $C_1$ and a resistance $R_1$ is connected across the rectifiers $D_1$, $D_2$. An output indicator 28 is connected across the resistance $R_1$ to provide an indication of the voltage developed across the resistance $R_1$. The output indicator may be a meter, an oscilloscope, a strip recorder, an analog to digital converter, or other suitable voltage-indicating device.

In operation, the capacitance $C_S$ is charged from the current source 10 through the rectifier $D_2$ when the line 30 is positive with respect to the line 31. When the switch 11 is closed, the capacitance $C_S$ is discharged into the load through the rectifier $D_1$. After discharge, the switch 11 is opened and the capacitance $C_S$ is again charged. If the line 31 is positive with respect to the line 30 during charging, charging occurs through the rectifier $D_1$ and discharge occurs through the rectifier $D_2$.

Figure 3A:
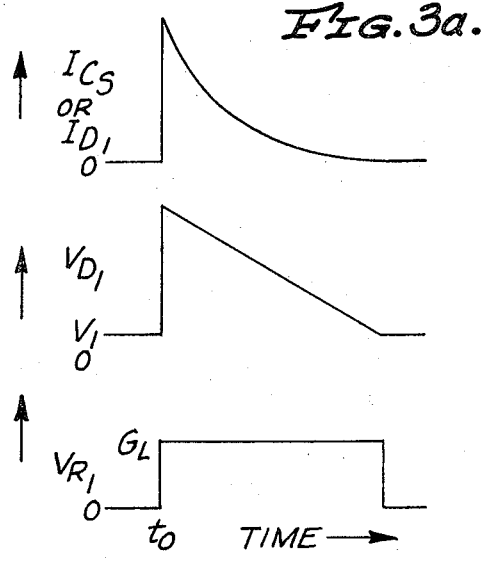
FIGS. 3a and 3b are sets of waveforms illustrating the operation of the invention.

A plot of discharge current through the capacitance $C_S$ or the rectifier $D_1$ is illustrated in the top graph of FIG. 3a. The rectifier $D_1$ has a logarithmic voltage-current characteristic so that the voltage across the rectifier $D_1$ has a straight line slope, as illustrated in the middle graph of FIG. 3a. The voltage $V_1$ is the forward conduction or starting voltage for the rectifier and for a conventional silicon diode, is in the order of 0.7 volt. The series circuit comprising the capacitance $C_1$ and the resistance $R_1$ is a differentiator circuit and the output voltage developed across the resistance $R_1$ is the derivative of the voltage across the diode. The bottom graph of FIG. 3a illustrates the voltage across the resistance $R_1$ during discharge as being a flattop pulse. It can be shown that the magnitude of this voltage $VR_1$ is directly proportional to the conductance $G_L$ of the load. Thus, it is seen that the system of FIG. 1 provides a direct indication of the conductance of the load at any time during the discharge of the capacitance $C_S$. This measurement is not dependent upon the magnitude of the voltage across the load. The instrument may be calibrated to read conductance directly by testing loads with known conductance.

Figure 3B:
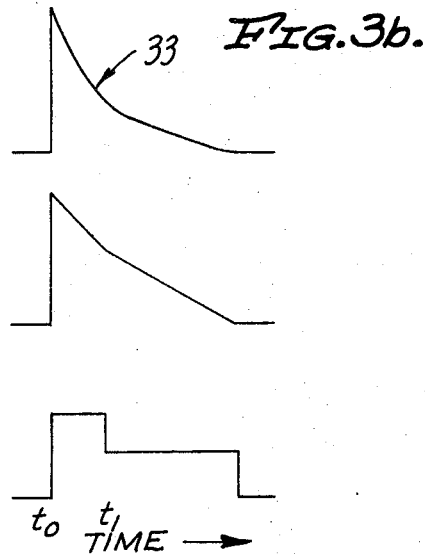

It is readily seen that the system provides a dynamic or continuous measurement of load conductance. If the conductance changes during the discharge of the capacitance $C_S$, the indicated output will have a corresponding change. See for example, the graphs of FIG. 3b. If there is a change in the conductance of the load at time $t_1$, there will be an inflection point 33 in the curve for the discharge current, resulting in a change in slope for the rectifier voltage and a change in magnitude for the output voltage.

Where bipolar operation is utilized, both rectifiers $D_1$ and $D_2$ should have the substantially logarithmic characteristic. Where unipolar operation is used, only the rectifier in the discharge circuit need have the logarithmic characteristic. Further, with unipolar operation, the other rectifier may be omitted and other devices such as a switch substituted in the charging circuit.

The system of FIG. 1 is particularly suited for dynamic measurement of conductance of an electric treater but, of course, is not limited to this specific load and is readily used in measurement of characteristics of other loads. Examples of other types of loads with which the instrument might be used include the determination of the quality of a spot weld produced by a capacitance discharge welder, the monitoring of current in a radar pulse analyzer, and the analysis of the firing of spark plugs in internal combustion engines to determine quality of plugs, wiring, combustion, and compression.

The present system is well suited for use in engine analyzers since it responds to the discharge of stored electrical energy from a capacitance or inductance into a load of a combustion chamber.

Figure 2:
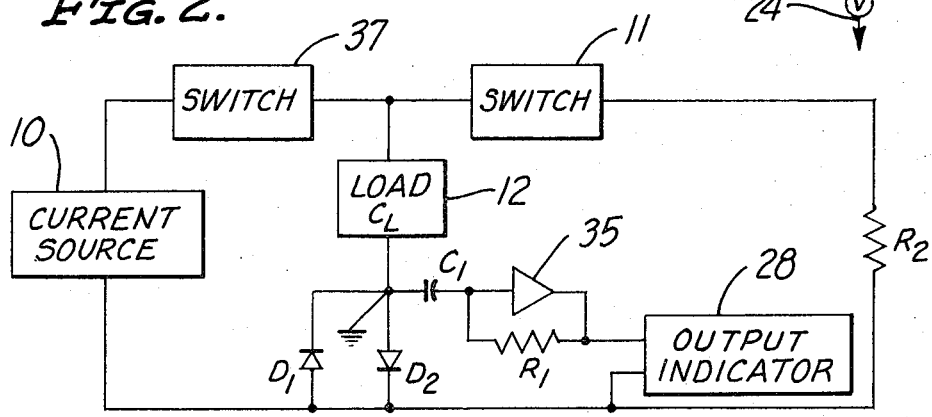
FIG. 2 is another diagram illustrating an alternative embodiment of the instrument of FIG. 1.

An alternative embodiment of the system providing for measurement of capacitance of a load is illustrated in FIG. 2, wherein components corresponding to those of FIG. 1 are identified by the same reference numerals. The system of FIG. 2 differs from that of FIG. 1 in that the load 12 is substituted for the capacitance $C_S$, and a reference resistance $R_2$ is substituted for the load 12. Also, an alternative form of differentiator circuit is illustrated, namely, an operational amplifier comprising an amplifier 35 with the resistance $R_1$ connected as a feedback resistor and with the capacitance $C_1$ connected at the amplifier input. The output of the operational amplifier is the derivative of the input thereto and the circuit of FIG. 2 may be substituted for the circuit of FIG. 1 if desired. Of course, other conventional differentiator circuits may be utilized in place of either of those illustrated.

In the operation of the system of FIG. 2, the capacitance of the load 12 is charged from the current source 10. The charged capacitance is then discharged into the resistance $R_2$ by closing the switch 11. The discharge current is an exponential curve and the voltage developed across the rectifier in series with the load has a straight line slope. The output signal from the differentiator circuit is a flattop pulse, with the magnitude being inversely proportional to the capacitance of the load. The magnitude of the resistance $R_2$ should be such that the current source is not overheated or otherwise damaged during a measurement. Another switch 37 may be positioned between the current source 10 and the load 12 in the circuit of FIG. 2 and operated in synchronism with the switch 11 to disconnect the source from the load during discharge of the load capacitance. The switch 37 desirably is used when the impedance of the current source 10 is not relatively higher than the magnitude of the load $R_2$. The switch 37 is readily omitted when the impedance of the current source is high relative to that of the resistance $R_2$. FIG. 3a illustrates the operation of the current of FIG. 2, with $1/C_L$ substituted for $G_L$ in the bottom graph.

Figure 4:
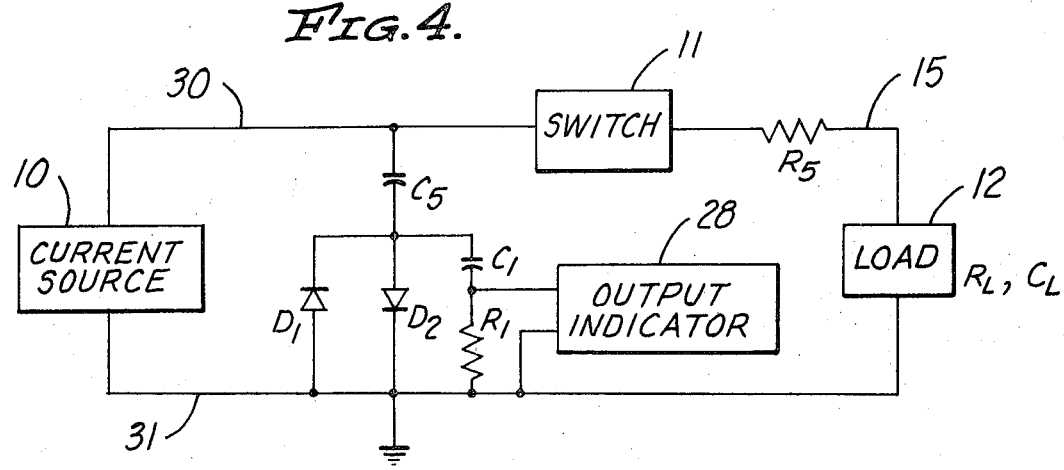
FIG. 4 is another diagram illustrating another alternative embodiment of the instrument of FIG. 1.

Another alternative embodiment of the system which provides for measurement of capacitance and conductance or resistance of the load is illustrated in FIG. 4, wherein components corresponding to those of FIG. 1 are identified by the same reference numerals. A resistance is connected in series with the load, here illustrated as the resistance $R_S$ between the switch 11 and load 12.

In the operation of the circuit of FIG. 1, there is an initial spike of current of very short duration when the switch 11 is closed, as the capacitance of the load is charged. This high-current spike ends when the capacitance $C_S$ and the capacitance of the load come to voltage equilibrium. With the circuitry of FIG. 1, the time to reach equilibrium is so short that the current spike may be ignored. When the resistance $R_S$ is incorporated in the circuit, the time to reach equilibrium is increased and the operation of the system during this time can be utilized to provide a measure of the capacitance of the load.

Figure 5:
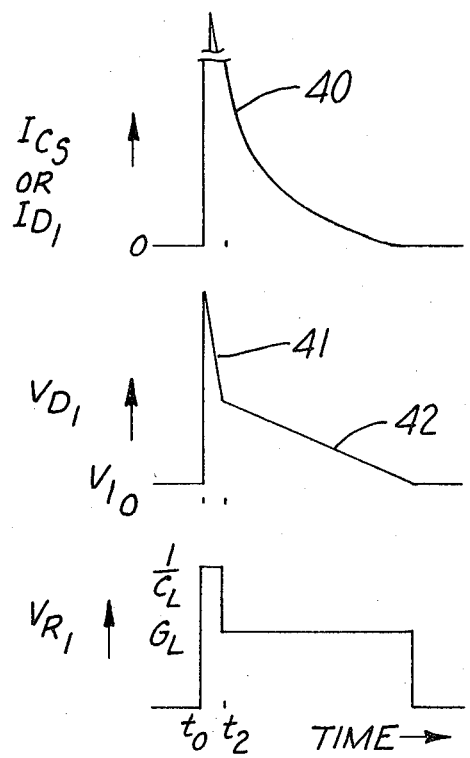
FIG. 5 is a set of waveforms illustrating the operation of the instrument of FIG. 4.

In the operation of the circuit of FIG. 4, the switch 11 is closed, discharging the capacitance $C_S$ through the resistance $R_S$ into the load, initially the load capacitance is charged with a relatively high current and the capacitance $C_S$ and the load capacitance $C_L$ come to an equilibrium at time $t_2$. This results in an inflection point at 40 in the discharge current as illustrated in the upper graph of FIG. 5. Then the two capacitances discharge through the load resistance $R_L$ until the discharge current drops to zero. With this circuit arrangement, the slope of the first portion 41 of the diode voltage is inversely proportional to the capacitance of the load and the slope of the second portion 42 is proportional to the conductance of the load, as illustrated in the bottom graph of FIG. 5. In the operation of the system of FIG. 4, it is preferable to have the value of the resistance $R_S$ and the capacitance $C_S$ small with respect to the resistance and capacitance of the load, typically in the order of one-tenth or less.

The instrument of the invention has a wide operating range and may be used in conjunction with a system where for example, the instantaneous current may range from 4 milliamperes to 4,000 amperes.

Although exemplary embodiments of the invention have been disclosed and discussed, it will be understood that other applications of the invention are possible and the embodiments disclosed may be subjected to various changes, modifications and substitutions without necessarily departing from the spirit of the invention.

I claim:

1. In an electric emulsion treater having a load-measuring instrument, the combination of:

a container for fluid to be treated and having an inlet and upper and lower outlets for fluid flow therethrough, and a pair of electrodes disposed in said container in spaced relation for fluid flow therebetween, said container and electrodes defining a load element;

a reference element of known impedance;

rectifier means having a substantially logarithmic voltage-current characteristic;

first circuit means for capacitively charging one of said load and reference elements;

second circuit means for connecting said charged element and said rectifier means in series with said electrodes across the other of said elements for discharging the charged element through said rectifier means into the other element; and a differentiator circuit having its input connected across said rectifier means and providing an output signal which is the derivative of the input signal thereto, whereby the magnitude of said output signal during said discharging is a function of the impedance of said load element.

2. An instrument as defined in claim 1 wherein said reference element is a capacitance and is charged by said first circuit means and is discharged into said load element, and said output signal is proportional to the conductance of said load element.

3. An instrument as defined in claim 2 in which said second circuit means includes a reference resistance connected in series with said load element, with said output signal having for a first period of time, a first value inversely proportional to the capacitance of said load element, and for a second time period, a second value proportional to the conductance of the said load element.

4. An instrument as defined in claim 1 wherein said reference element is a resistance and said load element is charged by said first circuit means and is discharged into said reference element, and said output signal is inversely proportional to the capacitance of said load element.

5. An instrument as defined in claim 1 in which said differentiator circuit includes a resistance and a capacitance connected in series, with said output signal being developed across said differentiator circuit resistance.

6. An instrument as defined in claim 1 in which said differentiator circuit includes an operational amplifier.

7. An instrument as defined in claim 1 including second rectifier means having a substantially logarithmic voltage-current characteristic and connected in parallel with and in opposite polarity to said one rectifier means.

8. A method of measuring an impedance characteristic of an electric emulsion treater during application of treating power in pulses, including:
charging the capacitance of a first element;
discharging the charged capacitance through rectifying means into a second element, with the rectifying means having a substantially logarithmic voltage-current characteristic and with one of said elements comprising the treater and the other comprising a reference element; and
differentiating the voltage developed across the rectifying means during discharging of the capacitance to provide a derivative signal the magnitude of which is a function of the impedance of the treater.

9. The method of claim 8 wherein the conductance of a treater is measured, with the first element comprising a reference capacitance and the second element comprising the treater, and with the magnitude of the derivative signal being directly proportional to the conductance of the treater during discharge of the capacitance.

10. The method of claim 8 for measuring the capacitance of a treater, with the treater comprising the first element and a reference resistance comprising the second element, and with the magnitude of the derivative signal being inversely proportional to the capacitance of the treater during discharge of the capacitance.

11. The method of claim 8 for measuring the capacitance and conductance of a treater, with the first element comprising a reference capacitance and the second element comprising the treater, and with the charged capacitance being discharged through a reference resistance into the treater, and with the magnitude of the derivative signal being inversely proportional to the capacitance of the treater for a first time period and being directly proportional to the conductance of the treater for a second later time period.

* * * * *